UNITED STATES PATENT OFFICE.

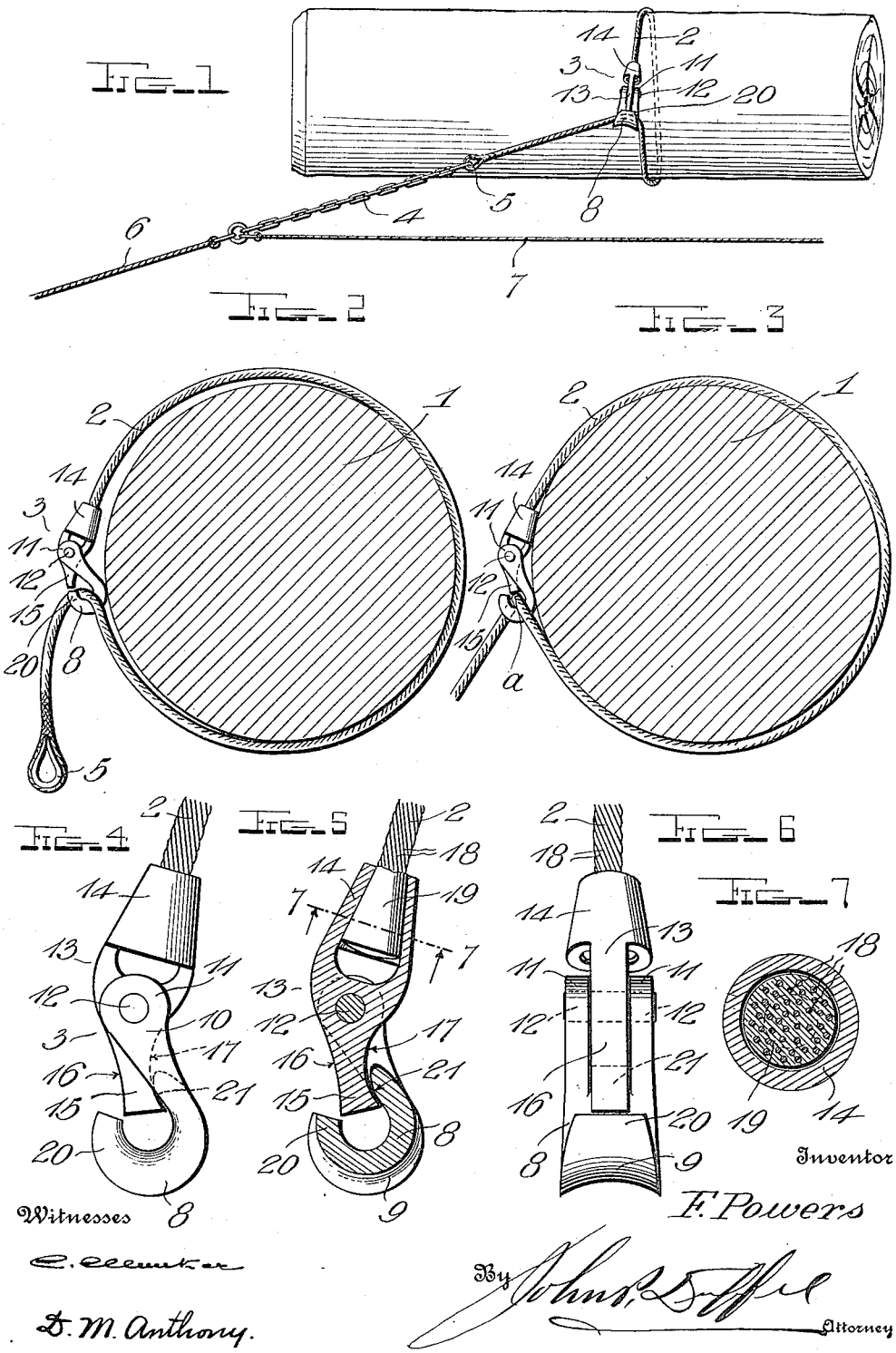

FRED POWERS, OF MARSHFIELD, OREGON.

SAFETY CHOKER-HOOK.

1,144,430.  Specification of Letters Patent.  Patented June 29, 1915.

Application filed April 19, 1912, Serial No. 691,880. Renewed April 27, 1915. Serial No. 24,349.

*To all whom it may concern:*

Be it known that I, FRED POWERS, a citizen of the United States, residing at Marshfield, in the county of Coos and State of Oregon, have invented certain new and useful Improvements in Safety Choker-Hooks, of which the following is a specification.

This invention relates to a safety choker hook.

Logging in certain sections of the country is carried on almost exclusively with large donkey engines, the logs being transported by dragging them along the ground or in prepared chutes, or troughs by means of wire cables. The logs are very large running as high as twelve feet in diameter and are fastened to a cable for transportation by what is known as a choker, that is, a short steel cable which is wrapped around the logs once or twice and then fastened by loops to the choker hook on the main line. Where the country is more or less rugged, and particularly when the logs are hauled down steep inclines, in wet weather, and even sometimes in dry weather, the logs slip ahead faster than the cable and very often by reason of the slack the loops of the choker come out of the hook and the log is thus freed from the cable altogether, and sometimes causes great damage to persons and property.

The object of this invention is therefore to overcome these difficulties by providing a choker hook which will absolutely prevent the log from slipping from the choker.

With the foregoing objects in view the invention consists in the novel features of construction, illustrated in the drawings and pointed out in the appended claim.

In the accompanying drawings: Figure 1 is a plan view illustrating the application of the safety choker hook. Fig. 2 is a transverse section taken through the log illustrating the position of the choker hook before the choker is tightened. Fig. 3 is a similar view after tightening the choker around the log. Fig. 4 is a side elevation of the choker hook. Fig. 5 is a sectional view of the choker hook. Fig. 6 is a front view of the choker hook and Fig. 7 is a transverse section taken on line 7—7 of Fig. 5 showing the manner of connecting the choker hook with one end of the choker.

Referring to the drawings for a more particular description of the invention, 1 indicates a log, 2 the choker, which is in the form of a short piece of wire cable which may be wrapped one or more times around the log to be hauled or transported, 3 the safety choker hook, as a whole, 4 the butt chain which is connected at one end to a loop 5 formed at the free end of the choker, and at its opposite end to the main line 6.

7 indicates the return line connected in any suitable manner to the main line. The choker hook 3 comprises a hooked-shaped member 8, the outer or bottom surface 9 of which is made slightly concave, as shown more particularly in Figs. 5 and 6. The body 10 of the hook-shaped member is forked or bifurcated to provide a pair of laterally spaced bearing ears or lugs 11, between which, on the bearing pin 12, the ends of which fit in corresponding apertures in said ears, is pivoted the catch member 13. The catch member comprises an outwardly tapered socket 14 and a catch 15 having an approximately straight outer edge and an inwardly curved inner edge 17. One end of the choker is swiveled to the socket of the catch member by operating the strands 18 of the wire cable, as shown in Fig. 7 and embedding them in the Babbitt metal 19. This means of connecting the choker with the hook allows the hook to be turned freely without twisting the line and makes it impossible for the choker becoming detached from the hook.

In practice, the free end of the choker is passed through the hook 20 of the hook-shaped member 8 and when a pull is exerted on the main line and free end of the choker, the two members of the choker hook assume the position shown in Figs. 3 to 5, inclusive, under which conditions the inner end of the catch or extension member 15 abuts against the inner wall 21 and engages the choker at *a* which prevents the choker from slipping around the log or from unhooking, even should the log run ahead of the main line.

From the foregoing description taken in connection with the drawings, it is thought that the construction and advantages of this invention will be readily understood without requiring a more extended explanation.

Various changes in the form, proportions and minor details of construction may be resorted to without departing from the principles or sacrificing any of the advantages of this invention as defined in the appended claim.

Having described my invention what I claim as new is:

A safety choker hook of the class described comprising a hook-shaped member consisting of a body portion having a bifurcated outer end and an inwardly bent hook at its inner end, a catch having a straight outer edge and an inwardly curved inner edge pivoted in the bifurcated end of the hook-shaped member with its inner end terminating at a point adjacent the outer end of the hook, the catch adapted to swing inwardly over the outer end of the hook against the inner wall of the body portion of the hook-shaped member to bring the inner end of the catch directly over the bend of the hook to bite or clamp the choker in said bend, the inwardly curved inner edge of the catch adapted to fit against the inner wall of the body portion of the hook-shaped member.

In testimony whereof I affix my signature in presence of two witnesses.

FRED POWERS.

Witnesses:
 JOHN D. GOSS,
 ALICE PECK.

Copies of this patent may be obtained for five cents each, by addressing the "Commissioner of Patents, Washington, D. C."